United States Patent [19]

Woditsch et al.

[11] 4,014,710
[45] Mar. 29, 1977

[54] MAGNETIC PIGMENTS WITH IMPROVED ORIENTABILITY AND A PROCESS FOR THEIR PRODUCTION

[75] Inventors: Peter Woditsch, Krefeld; Franz Hund; Gunter Buxbaum, both of Krefeld-Bockum; Volker Hahnkamm, Krefeld; Ingo Pflugmacher, Meerbusch, all of Germany

[73] Assignee: Bayer Aktiengesellschaft, Leverkusen, Germany

[22] Filed: July 18, 1974

[21] Appl. No.: 489,665

[30] Foreign Application Priority Data

Aug. 2, 1973 Germany .................... 2339142

[52] U.S. Cl. .................... 106/304; 106/308 Q; 252/62.56
[51] Int. Cl.² .................... C09C 1/24
[58] Field of Search ............ 106/308 Q, 309, 304; 252/62.56, 62.57

[56] References Cited

UNITED STATES PATENTS

| | | | |
|---|---|---|---|
| 2,760,876 | 8/1956 | Schalman | 106/308 Q |
| 2,886,460 | 5/1959 | Alexander | 106/308 Q |
| 3,004,859 | 10/1961 | Lichtenwalner | 106/308 Q |

FOREIGN PATENTS OR APPLICATIONS 1,767,973  10/1970  Germany

*Primary Examiner*—Patrick P. Garvin
*Assistant Examiner*—J.V. Howard
*Attorney, Agent, or Firm*—Burgess, Dinklage & Sprung

[57] ABSTRACT

An acicular, magnetic iron oxide pigment containing about 0.05 to 5% by weight of an organo silicon compound is produced by treating iron oxide hydroxide seeds either dry or in suspension with an organo silicon compound. Preferred organo silicon compounds comprise polymethylphenylsiloxane, polydimethylsiloxane and polydiphenylsiloxane. Trivalent metal ions may subsequently be deposited. The resulting pigments show only minimal losses of coercive force during processing into magnetic tapes.

10 Claims, No Drawings

MAGNETIC PIGMENTS WITH IMPROVED ORIENTABILITY AND A PROCESS FOR THEIR PRODUCTION

This invention relates to magnetic iron oxides having improved orientability, and to a process for their production. The orientability of a magnetic pigment is expressed by the ratio, as measured on a directional magnetic tape, between remanent and saturated magnetization in the tape direction. A high $B_R/B_S$-value (more precisely $B_{R/4\pi I_s}$) is desirable in magnetic pigments because the remanent magnetization left in the tape increases with increasing orientability, so resulting in a higher magnetic flux in the tape. In turn, this higher flux improves the electroacoustic properties of the tape, for example its sensitivity, treble modulatability, frequency response and, in conjunction with a relatively high coercive force, recording density.

The characteristic property of high-grade magnetic recording materials is their acicular form which, through dimensional anisotropy, determines the magnetic values of the completed pigments and of magnetogram supports produced from them. Since magnetic iron oxides, such as $Fe_3O_4$, $\gamma$-$Fe_2O_3$ or ferrites crystallizing in the spinel lattice, have a cubic crystal structure, isometric particles are exclusively formed in those cases where these compounds are directly produced. In order to obtain anisometric magnetic pigments based on iron oxide an alternative procedure must be adopted. At present, the starting material used is almost exclusively acicular $\alpha$-FeOOH or goethite (acicular iron ore). This acicular iron oxide hydroxide can be converted into $\gamma$-$Fe_2O_3$ by either a multistage process comprising dehydration, reduction into $Fe_3O_4$ and subsequent reoxidation at a temperature below 400° C, or in a one-stage process carried out in the presence of special organic compounds (German DAS 1,203,656). The acicular form has to remain substantially intact in these processes. It can be appreciated that, in the course of repeated lattice rearrangement, a contraction in volume of about 27% during dehydration, reduction at temperatures of up to 450° C in the presence of hydrogen or organic substances and subsequent reoxidation, the needles lose some of their shape. This needle deformation can be caused by sintering in all of the conversion stages, in other words aggregates or agglomerates are formed by localized or widespread intergrowth. Previous attempts have been made to counteract sintering by an aftertreatment with a variety of different substances. There are essentially two methods by which coarsening, sintering and aggregation or agglomeration can be counteracted. The first of these methods comprises aftertreating the $\alpha$-FeOOH starting material with an inorganic substance, while the second comprises coating the starting material with a considerable quantity of organic compounds which subsequently act as reducing agents at elevated temperatures. In this particular method, each individual particle is surrounded by an organic layer which prevents intergrowth with the adjacent particles.

According to German DAS 1,252,646, the acicular iron oxide particles are stabilized by aftertreating the $\alpha$-FeOOH with salts of Al, Ti, Zr or with alkali metal silicates. Coating is obtained by treating the $\alpha$-FeOOH with a solution of Al-, Ti-, Zr-salts or alkali metal silicates. The pH-value of the solution is adjusted to the range in which hydrolysis begins. By stabilizing the acicular iron oxide particles in this way, subsequent dehydration, reduction and oxidation at elevated temperatures and in relatively wide temperature ranges can be performed in such a way that the original shape of the particles is kept substantially intact. Accordingly, the installations required for carrying out this process can be made simpler and operated with a greater throughput.

Another stabilizing process based on coating with an inorganic substance is described in German DOS 1,592,214. The magnetic and electroacoustic properties of $\gamma$-$Fe_2O_3$ in the magnetic layers produced in this process are improved by dispersing the FeOOH which has been freed from the soluble constituents, and adding hydrolysis-resistant, inorganic substances such as oxyacids of phosphorus and boron and their salts. By adsorbing the compounds on the surface of the $\alpha$-FeOOH, it is possible to utilize the advantages of the elevated reduction temperature during subsequent processing into $\gamma$-$Fe_2O_3$. After conversion into $\gamma$-$Fe_2O_3$, pigments treated in this way show an orientability which has improved to around 0.80 by comparison with a non-pretreated $\gamma$-iron oxide which has a $B_R/B_S$-values of about 0.72.

German DOS 1,803,783 is also concerned with the prevention of sintering during the reduction of $\alpha$-FeOOH into $Fe_3O_4$. Before dehydration, the iron oxide hydroxide starting material is coated with chromium (III) oxide or its hydrates, in a quantity of from 0.05 to 10% by weight, expressed as metallic chromium. The aftertreated and converted pigments show a much lower apparent density. This indicates the absence of sintering and coarsening phenomena during conversion.

Another method of obtaining magnetic $\gamma$-$Fe_2O_3$, described in German DAS 1,771,327, is to coat $\alpha$-FeOOH with at least one hydrophobic aliphatic monocarboxylic acid containing from 8 to 24 carbon atoms, and to heat the coated oxide particles in the presence of air at a temperature of from 400° to 650° C. This one-stage process is intended to improve the quality of $\gamma$-iron oxide in regard to its orientability. The magnetogram supports produced with iron oxides by the aforementioned process show improved $B_R/B_S$-values. Whereas the ratio of remanent to saturation magnetization in a standard tape amounts to 0.76, the iron oxides produced by the abovementioned process show a $B_R/B_S$-value in the tape of 0.79.

German DOS 2,064,804 is concerned with a similar process. In this process, a non-magnetic iron compound is magnetized by heating in organic compounds of the following classes: (1) a higher hydrocarbon, (2) a higher alcohol or a higher amine, (3) a higher fatty acid or salts thereof and (4) an oil and fat or wax. If necessary, the magnetic iron oxide formed can be reoxidized.

This process is intended to protect the acicular form and to provide the magnetic pigment particles with high quality surfaces. The last two of the aforementioned processes are complicated to carry out on a commercial scale and require strict adherence to the special working conditions in order to avoid the formation of $\alpha$-$Fe_2O_3$.

It is accordingly an object of the present invention to provide, by a simple process, an acicular magnetic iron oxide pigment which imparts superior properties to recording tapes made therefrom.

This object is realized in accordance with the present invention pursuant to which there is provided an acicular, magnetic iron oxide pigment, optionally modified with ions, containing about 0.05 to 5% by weight of an organo silicon compound.

The invention also provides a process for the production of an acicular, magnetic iron oxide pigment, optionally modified with ions by dehydrating, reducing and optionally reoxidizing acicular iron oxide hydroxide optionally modified with ions, wherein the acicular iron oxide hydroxide is treated with an organo silicon compound.

It is possible by the process according to the invention to aftertreat an acicular iron oxide hydroxide based on $\alpha$-FeOOH, $\beta$-FeOOH and $\gamma$-FeOOH, which may optionally be modified with foreign ions, such as $Co^{2+}$, $Zn^{2+}$, $Cd^{2+}$, $Mn^{2+}$ and/or $Ni^{2+}$, in a quantity of about 1 to 10% by weight, such as for example (Fe, Co)OOH, in dry form or in suspension with an organo silicon compound. The iron oxide hydroxide suspension can be a suspension in aqueous or organic medium, such as for example ethanol, acetone or toluene, or in an aqueous/organic medium, such as for example toluene/$H_2O$ mixtures or xylene/water mixtures. Even small quantities of silicone resins, silicone oils, or other organo silicon compounds, such as organo halogen silanes, alkalimetal organo siliconates and/or organo silanols, are sufficient to surround the acicular FeOOH in aqueous solution, presumably with a protective shell which largely prevents sintering, intergrowth and coarsening of the pigment particles during the conversion of FeOOH into magnetic $Fe_3O_4$ or $\gamma$-$Fe_2O_3$. Suitable silicone resins include polydiorganosiloxanes, namely polydialkylsiloxanes, polyalkylarylsiloxanes or polydiarylsiloxanes, wherein the alkyl groups have preferably from 1 to 4 carbon atoms and the aryl groups have preferably from 6 to 10 carbon atoms, with a degrees of polymerization of about 50 to 100, such as for example polymethyl siloxanes, polymethylphenylsiloxanes or polydiphenylsiloxanes [for the chemistry of silicones, see Chem. Technologie, Vol. 5, Hauserverlag (1972), Hrsg. Winnacker-Kuchler, Pages 252 et seq, also Chemie und Technologie der Silicone, Walter Noll, Verlag Chemie 1960, Page 253 et seq]. Suitable silicone oils include polydialkylsiloxanes or polyarylalkylsiloxanes wherein the alkyl groups have preferably from 1 to 4 carbon atoms and the aryl groups have preferably from 6 to 10 carbon atoms with a viscosity of about 5 to 2000,000 centistokes, such as for example polydimethyl siloxanes or polyphenylmethylsiloxanes (loc. cit. pages 272 et seq and loc. cit., pages 287 et. seq.). The following compounds are examples of monomeric alkalimetal organo siliconates suitable for use in accordance with the invention; $(CH_3)_3SiONa$, $(C_6H_5)_3SiONa$, $CH_3(C_6H_5)_2SiONa$ or $(CH_3)_2(C_6H_5)SiONa$, which can also be used in polymeric form with a degree of polymerization of from about 2 to 20 (loc. cit., pages 284 et seq, and loc. cit., pages 73 et seq). Suitable organo halogen silanes include alkyl-, aryl- and alkylaryl-halogen silanes such as, for example, $(CH_3)_3SiCl$, $(CH_3)_2SiCl_2$, $(C_2H_5)_3SiCl$, $(C_6H_5)_3SiCl$ or $C_6H_5(CH_3)SiCl_2$ (loc. cit., page 261 and loc. cit. page 57). Examples of suitable alkyl or aryl silanols include $(CH_3)_3SiOH$, $(CH_3)_2Si(OH)_2$, $(C_2H_5)_2Si(OH)_2$, $(C_2H_5)_3SiOH$, $(C_6H_5)_3SiOH$ or $(C_6H_5)_2Si(OH)_2$ (loc. cit., page 260, and loc. cit., page 73).

The iron oxide hydroxide aftertreated by means of one or more organo silicon compounds, for example in aqueous suspension, by the process according to the invention, can readily be processed by conventional processes. Thus, after filtration and drying at about 200° to 300° C, the acicular FeOOH containing the organo silicon compound can be dehydrated and subsequently reduced in a stream of hydrogen at about 350° to 450° C to form magnetic, acicular $Fe_3O_4$. The reoxidation of $Fe_3O_4$ into magnetic, acicular $\gamma$-$Fe_2O_3$ can be performed in the presence of air at a temperature below around 300° to 350° C, in order to avoid the formation of magnetic $\alpha$-$Fe_2O_3$. Partial decomposition of the organo silicon compounds during dehydration, reduction and reoxidation cannot be totally eliminated. However, it is possible by chemical analysis to detect considerable quantities of organically bound carbon. Similarly, the presence of organo silicon compounds after dehydration, reduction and reoxidation can be detected by infra red spectroscopy. This can be done, for example, by extracting the organo silicon component of the magnetic pigment with diethylether, subsequently removing the diethylether and determining the residue of the extract by infra red analysis. Depending upon the particular organo silicon compound used for the aftertreatment process, the infra red spectrum shows characteristic IR-bands, inter alia for Si-alkyl between 1240 and 1280 $cm^{-1}$, for Si-aryl between 1430 and 1470 $cm^{-1}$ and for —Si—O—Si— between 1000 and 1150 $cm^{-1}$.

By virtue of the process according to the invention for aftertreating acicular FeOOH with organo silicon compounds, it is possible to obtain new magnetic iron oxides, $Fe_3O_4$ and $\gamma$-$Fe_2O_3$, which contain organo silicon compounds and which are distinguished by a very high level of orientability after they have been incorporated into magnetogram supports. One particularly desirable property of the magnetic pigments according to the invention is the fact that they can readily be incorporated into conventional binder systems which leads to readily regenerated casting lacquers. Hitherto, lacquers of this kind have never satisfactorily lent themselves to regeneration as, on completion of grinding, the pigment particles undergo secondary regeneration and reagglomeration under the effect of the magnetic forces. Additional dispersion energy is therefore required for redispersing this cast lacquer back into its former condition. With the pigments according to the invention, it is possible to obtain adequate redispersion with minimal energy consumption, so that orientability in the tape can be increased to a value of about 0.84 to 0.85. $B_R/B_S$-values as high as these provide for the production of improved, magnetic recording supports which are distinguished in particular by a wider dynamic range. Another advantage of the magnetic pigments according to the invention is reflected in the lower coercive-force losses which are incurred during incorporation into magnetic tapes.

The coercive forces in the powder and in the tape differ for various reasons. Due to magnetic orientation in the longitudinal direction of the tape, the magnetic tape should show greater coercive forces than the powder. This is counteracted by a reduction in coercive force due to the higher packing density of the pigment in the tape. Another influence is the destruction of the primary particles during production of the casting lacquer. If the loss of the coercive force incurred during the incorporation of $\gamma$-$Fe_2O_3$ into the magnetogram support is regarded as a consequence of the destroyed acicular form, then the decrease in coercive force will be greater the more heavily the needles are agglomerated or aggregated, i.e. the greater the grinding energy which has to be expended in producing discrete individual particles. Magnetic pigments containing organo silicon compounds produced in accordance with the invention ($Fe_3O_4$ and $\gamma$-$Fe_2O_3$) show only minimal losses of coercive force during processing into magnetic tapes.

The aftertreatment of the FeOOH starting material is easy to carry out. In one special embodiment, the organo silicon compound is added in the form of a solution or emulsion to a washed or unwashed pigment suspension with a solids content of about 4 to 40% by weight, in a quantity of about 0.05 to 5% by weight, preferably in a quantity of more than about 0.1% by weight, based on the weight of the pigment, followed by stirring for about 30 minutes. Aftertreatment is carried out in a pH range of about 2 to 9, preferably about 3 to 7. In cases where silicone oils or silicone resins are used, it is preferred to introduce about 0.05 to 2% by weight, preferably about 0.05 to 0.5% by weight, based on the weight of the pigment, of tri-valent metal ions at a pH-value of 4, following addition of the silicone emulsion or silicone resin to the FeOOH, and subsequently to precipitate these metal ions by increasing the pH-value to between about 5 and 7 by adding basic precipitants, for example sodium hydroxide, over a period of about 30 minutes in order to fix the silicone oil.

There is no need for precise temperature control in carrying out the aftertreatment according to the invention. Aftertreatment can be carried out at a temperature of about 15° to 90° C. In another modification of the aftertreatment process according to the invention, small quantities of dispersion aids, for example trisodiumphosphate, are added to the iron oxide hydroxide suspension in order to obtain ready dispersibility of the particles and, hence, to create a large surface to which the Si compound can subsequently be attached.

The quantity in which the organo silicon compound is used for aftertreatment depends upon the degree of retention on the pigment. Economically interesting aftertreatment agents are, in particular, organo silicon compounds of the kind which are almost completely retained on FeOOH. In cases where silicone oils are used, with subsequent precipitation of trivalent metal ions of Fe, Cr, Mn, Al, Ga, In, La, Ce and the rare earths, it is sufficient to use quantities of as low as about 0.05 to 0.5% by weight, based on FeOOH; Fe and Mn may already be present as part of the pigment. Silicone resins with different degrees of crosslinking, containing alkyl or aryl groups, are also firmly retained on the FeOOH-surface from aqueous suspension and, for this reason, are actually effective in quantities of as small as about 0.2% by weight.

The invention is illustrated by the following Examples:

EXAMPLE 1

A preliminary product of commercial-grade magnetic iron oxide was ordered from the manufacturer in the form of a suspension, and was subjected to various aftertreatments with organo silicon compounds. The starting material was produced by the precipitation process. Pigment formation is carried out by the addition of $FeSO_4$ solution to an $\alpha$-FeOOH seed, for example as described in German DOS 1,592,398, followed by precipitation with sodium hydroxide and oxidation with air.

800 g of the factory-prewashed $\alpha$-FeOOH, suspended in 13 liters of water, are introduced into an 18 liter Remanit vessel equipped with a turbostirrer, and heated to 80° C. The pH-value of the suspension is adjusted to 3.0 with $H_2SO_4$. 25.5 ml of a silicone oil emulsion (16 g of polydimethyl siloxane with a viscosity of approximately 100 centistokes in 100 ml of water) are added over a period of 10 minutes, followed by the dropwise addition of a solution of 5.25 g of $KCr(SO_4)_2 \times 12\ H_2O$ in 400 ml of water over a period of 20 minutes. The pH-value falls to 2.9 and, immediately afterwards, is adjusted to 7 by the addition of 2.5% NaOH over a period of 90 minutes. The suspension is filtered by means of suction filters, washed with water having a pH of 4 to 5 and dried at 110° C. 747 g of an iron oxide hydroxide aftertreated with silicone oil are obtained.

The $\alpha$-iron oxide hydroxide aftertreated in accordance with the invention is converted in known manner by dehydration at 300° C, reduction in a stream of hydrogen at 420° C for 30 minutes, and reoxidation with air at 300° C for 45 minutes.

The production of a magnetic tape can be carried out in accordance with British Patent No. 1,080,614 and is described in Example 8. A pigment converted in the same way, but not aftertreated, was used for comparison. The improvements in the $\gamma$-iron oxide obtained by aftertreatment with silicone oil are shown in Table 1.

EXAMPLE 2

The aftertreatment is carried out as in Example 1, but using 0.5% by weight of silicone oil (polydimethyl disiloxane) in the form of 64 ml of silicone oil emulsion. Instead of $KCr(SO_4)_2$-solution, an $(NH_4)Fe(SO_4)_2$-solution is used in a quantity of 0.2% by weight, expressed as $Fe_2O_3$. Improved magnetic pigments with the properties shown in Table 1 are obtained after conversion. The pigments produced in accordance with the invention are distinguished by a minimal loss of coercive force during tape production and by a high $B_R/B_S$-value in the tape.

EXAMPLE 3

$\alpha$-FeOOH is aftertreated in the form of a suspension in the same way as in Example 2, except that 0.29% of $P_2O_5$, based on $\alpha$-FeOOH, is added as a dispersion aid in the form of $Na_3PO_4$ solution prior to the addition of the silicone oil emulsion. The magnetic values of the powder and tape are also shown in Table 1.

EXAMPLE 4

25.5 ml of silicone oil emulsion (as in Example 1) (0.2% by weight of silicone oil, based on $\alpha$-FeOOH) are added to 800 g of FeOOH used as starting material, suspended in 13 liters of water, as in Example 1, followed by the addition over a period of 45 minutes of 0.3% of $P_2O_5$ in the form of $H_3PO_4$ over a period of 45 minutes.

After the pH-value has been increased to 5 by means of 1.5% NaOH over a period of 45 minutes, working up is carried out under the conditions specified in Example 1. The magnetic values of the magnetic iron oxides obtainable in accordance with Examples 1 to 4, both in the powder and in the tape, are set out in the following Table:

Table 1

|  | Coercive force (Oe) Powder | Tape (Oe) | Orientability $B_R/B_S$ |
| --- | --- | --- | --- |
| Without aftertreatment | 319 | 288 | 0.79 |
| Example 1 | 327 | 327 | 0.84 |
| Example 2 | 339 | 323 | 0.85 |
| Example 3 | 332 | 327 | 0.85 |
| Example 4 | 339 | 330 | 0.85 |

EXAMPLE 5

18.3 g of silicone resin solution (11 g of polymethyl phenyl siloxane in 8.2 ml of toluene), corresponding to 2.0% by weight of silicone resin, based on $\alpha$-FeOOH, are added with stirring, over a period of 20 minutes, at 80° C to an iron oxide hydroxide suspension containing 550 g of FeOOH in 14 liters of water prepared in the presence of 1% by weight of Zn-ions (based on $\alpha$-FeOOH) added during seed formation as in Example 1. This is followed by stirring for 1 hour at 80° C. Working up and tape production are carried out in the same way as described in Example 1. The analytically determined organically bound carbon content after conversion into $\gamma$-Fe$_2$O$_3$ is 0.05% by weight.

EXAMPLE 6

A solution of 5.5 g of polymethylphenyl siloxane/-polyester co-condensate (75% of siloxane, 25% of polyester, viscosity 1500 – 5000 c.Ss., specific gravity 1.11 g/cc) in 100 ml of toluene, corresponding to 1% by weight, based on $\alpha$-FeOOH, is added over a period of 20 minutes at 80° C, to an FeOOH-suspension prepared as in Example 5, followed by stirring at 80° C for 1 hour during which time air is introduced at a rate of 250 liters per hour. Working up and magnetic-tape production are carried out as in Example 1. The analytically determined organically bound carbon content after conversion into $\gamma$-Fe$_2$O$_3$ is 0.07% by weight.

EXAMPLE 7

25 liters of $\alpha$-FeOOH suspension containing 70 g of $\alpha$-FeOOH/liter are prepared in accordance with Example 1, followed by the addition, at 90° C and a pH of 3.0, of 53.6 ml of silicone oil suspension containing 3.36 g of polydimethyl siloxane. This is followed by the dropwise addition of 11 g of KCr(SO$_4$)$_2$. 12 H$_2$O in 200 ml of water, the pH-value being adjusted to 6.0 by means of 5% NaOH. After washing and drying, the product is reduced at 440° C and cooled under nitrogen. The Fe$_3$O$_4$ formed has the properties set out in Table 2. The pigments are processed in accordance with British Patent No. 1,080,614 by grinding 22.4 parts by weight of the magnetic oxide for 3.5 hours in a bead mill with 8.0 parts by weight of PVC/PVA copolymer, 1.3 parts of oleic acid, 0.88 parts of complex organic phosphoric acid esters and 67 parts of butyl-/ethyl acetate in a ratio of 1:1. The lacquer is then cast onto a 23$\mu$m thick polyester film. The magnetic layer has a thickness of 12 $\mu$m and contains 15 g/m$^2$ of magnetic pigment.

EXAMPLE 8

0.88 kg of a commercial-grade NaOH in 2 liters of water are added under nitrogen at 35° C to a solution of 6.95 kg of FeSO$_4$. 7 H$_2$O and 0.61 kg of CoSO$_4$. 7 H$_2$O in 15.3 liters of water in a 30 liter Remanit vessel, followed by oxidation by means of air at a rate of 100 l/h. The $\alpha$-FeOOH seed formation is terminated when a pH-value of 4.0 is reached. Pigment formation is carried out by the continuous addition of a 12.5% sodium hydroxide solution at a pH-value kept in the range 5.1 ± 0.2 by the increasing introduction of air until, at 250 l/h, the iron ions are completely precipitated. Finally, the pH-value can be increased to 6.0.

9 liters of the suspension obtained are heated with stirring to 80° C in an 18 liter Remanit vessel, the pH-value adjusted to 3.5 with H$_2$SO$_4$ and 19 ml of the silicone oil emulsion of Example 1 added dropwise. This is followed by stirring for 10 minutes, after which 7.5 g of NH$_4$Fe(SO$_4$)2 . 12 H$_2$O, dissolved in 200 ml of water, are added dropwise at pH 2.8 and the iron ions precipitated at pH 6.0 by the addition of 5% NaOH over a period of 2 hours.

Working up and tape production are carried out in the same way as described in Example 1.

The results of Examples 5 to 8 are summarized in Table 2.

Table 2

|  | Coercive force Powder | Oe Tape | Orientability $B_R/B_S$ |
| --- | --- | --- | --- |
| Example 5 | 353 | 325 | 0.84 |
| Example 6 | 390 | 334 | 0.85 |
| Example 7 | 373 | 366 | 0.82 |
| Example 8 | 559 | 528 | 0.82 |
| Non-aftertreated material | 400 | 340 | 0.79 |

EXAMPLE 9

Air is passed through 500 g of an $\alpha$-FeOOH in a stirrer-equipped vessel, and 0.45 g of methyltrichlorosilane is blown in over a period of 25 minutes. The product is converted into $\gamma$-Fe$_2$O$_3$ in known manner and the $\gamma$-Fe$_2$O$_3$ thus obtained is processed into magnetic tapes as described in Example 7. This produces a distinct improvement, as can be seen from the figures quoted in Table 3:

Table 3

|  | Orientability $B_R/B_S$ | $I^H_c$ (Oe) Powder |
| --- | --- | --- |
| Example 10 | 0.82 | 387 |
| Starting material for Example 10, non-aftertreated | 0.79 | 377 |

EXAMPLE 10

138 liters of NaOH solution (390 g/l) are added under nitrogen with vigorous stirring over a period of 3 minutes at 50° C to 312 liters of FeSO$_4$-solution (150 g/l of FeSO$_4$) in a 500 liter vessel. The contents of the vessel are oxidized for 1 hour with 1 Nm/h of air and then with 4 Nm$^3$/h of air until they have been completely oxidized into $\alpha$-FeOOH. The pH-value remains strong alkaline (about 14). The reaction time is about 6 hours, with a volume-time yield of 10 g/l/hr. The $\alpha$-FeOOH is filtered off, washed free from sulfate with desalted water and dried at 150° C.

A suspension with a solids content of 60 g/liter is prepared from 500 g of $\alpha$-FeOOH prepared by this method in a 15 liter vessel, heated to 50° C and adjusted to pH 3 by means of sulfuric acid.

5 g of the silicone resin solution of Example 6 are added dropwise with vigorous stirring over a period of 1 hour. 4.5 g of $NH_4Fe(SO_4)_2 \cdot 12 H_2O$, dissolved in approximately 100 ml of water at pH 3, are then stirred into the suspension and precipitated in the form of iron hydroxide by increasing the pH-value to 8 by the addition of alkali. The suspension is filtered under suction, washed with desalted water until it is neutral and dried at 150° C.

A $\gamma$-$Fe_2O_3$ produced from the product thus obtained has an orientability in the tape of 0.89.

It will be appreciated that the instant specification and examples are set forth by way of illustration and not limitation, and that various modifications and changes may be made without departing from the spirit and scope of the present invention.

What is claimed is:

1. In the production of an acicular, magnetic iron oxide pigment by forming acicular iron oxide hydroxide seeds, growing said seeds, dehydrating, reducing and reoxidizing, the improvement which comprises contacting said precursor pigment as $\alpha$-FeOOH, $\beta$-FeOOH or $\gamma$-FeOOH before hydration either in dry form or in suspension with about 0.05 to 5% its weight of an organo silicon compound.

2. The process of claim 1, wherein the organo silicon compound is a silicone resin or silicone oil.

3. The process of claim 1, wherein the organo silicon compound is at least one of a polydiorganosiloxane, an organohalogensilane, an organosilanol and an alkali metal organosiliconate.

4. The process of claim 3, wherein the organo silicon compound is at least one of a polymethylphenyl siloxane, a polydimethylsiloxane and a polydiphenylsiloxane.

5. The process of claim 1, wherein the acicular iron oxide hydroxide is treated with the organo silicon compound in suspension at a pH of about 2 to 9.

6. The process of claim 1, wherein following the addition of the organo silicon compound about 0.05 to 2% by weight of a trivalent metal ion based on the weight of iron oxide hydroxide is precipitated onto the iron oxide hydroxide at a pH of about 5 to 7.

7. The process of claim 6, wherein the trivalent metal ion precipitated is at least one of iron, chromium, manganese, aluminum, gallium, indium, lanthanum, cerium and the rare earths.

8. An acicular, magnetic iron oxide pigment containing about 0.05 to 5% by weight of an organo silicon compound and produced by the process of claim 1.

9. An acicular, magnetic iron oxide pigment according to claim 8, wherein the organo silicon compound is at least one polydiorganosiloxane, organohalogensilane or alkali metal organosiliconate which, in the IR spectrum, shows at least one characteristic band in one of the following wave-length ranges: 1240 to 1280 $cm^{-1}$, 1430 to 1470 $cm^{-1}$, 1000 to 1150 $cm^{-1}$.

10. An acicular, magnetic iron oxide pigment according to claim 9, containing up to about 10% by weight of at least one of Co, Zn, Cd, Mn and Ni and about 0.05 to 2% by weight of at least one trivalent metal ion selected from the group consisting of Cr, Al, Ga, In, La, Ce and the rare earths.

* * * * *